United States Patent
Choiniere et al.

(10) Patent No.: US 9,418,430 B2
(45) Date of Patent: Aug. 16, 2016

(54) METHOD AND APPARATUS FOR ESTABLISHING A NORTH REFERENCE FOR INERTIAL MEASUREMENT UNITS USING SCENE CORRELATION

(71) Applicant: BAE Systems Information and Electronic Systems Integration Inc., Nashua, NH (US)

(72) Inventors: Michael J. Choiniere, Merrimack, NH (US); Brendan P. Cirillo, Merrimack, NH (US); Robert W. Costantino, Milford, NH (US); Robert D. Frey, Bolton, MA (US); Haijun Hu, Wellesley, MA (US); Brian F. O'Donnell, Nashua, NH (US); David A. Richards, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/505,979

(22) Filed: Oct. 3, 2014

(65) Prior Publication Data
US 2015/0098617 A1    Apr. 9, 2015

Related U.S. Application Data

(60) Provisional application No. 61/886,382, filed on Oct. 3, 2013.

(51) Int. Cl.
| | | |
|---|---|---|
| *G06T 7/00* | (2006.01) | |
| *G01C 15/00* | (2006.01) | |
| *G06K 9/00* | (2006.01) | |

(52) U.S. Cl.
CPC .............. *G06T 7/0044* (2013.01); *G01C 15/00* (2013.01); *G06K 9/00671* (2013.01); *G06T 2207/10048* (2013.01); *G06T 2207/30212* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 8,275,544 B1* | 9/2012 | Wells .................... | G01C 21/165 342/146 |
| 8,989,444 B2* | 3/2015 | Choiniere et al. ........... | 382/103 |
| 2005/0008254 A1* | 1/2005 | Ouchi et al. ................... | 382/284 |
| 2012/0166137 A1* | 6/2012 | Grasser et al. ................ | 702/150 |
| 2013/0094707 A1* | 4/2013 | Metzler ......................... | 382/103 |
| 2013/0192072 A1* | 8/2013 | Gnepf .................... | G01C 19/38 33/228 |
| 2014/0146173 A1* | 5/2014 | Joyce et al. ................... | 348/144 |

* cited by examiner

*Primary Examiner* — Soo Park
(74) *Attorney, Agent, or Firm* — Sand & Sebolt, LPA; Daniel J. Long

(57) ABSTRACT

A scene correlation-based target system and related methods are provided. A reference image depicts a remotely-positioned object having identifiable characteristics, wherein a reference directional vector is established relative to the reference image. A target image of a general vicinity of the remotely-positioned object has an unknown directional vector, the target image having at least a portion of the identifiable characteristics. An inertial measuring unit has a scene correlation system, wherein the scene correlation system matches the portion of the identifiable characteristics of the target image with the identifiable characteristics of the reference image, wherein a slew angle between the reference image and the target image is calculated. A target image directional vector is derived from the calculated slew angle and the reference directional vector.

21 Claims, 10 Drawing Sheets

METHOD AND APPARATUS FOR ESTABLISHING A NORTH REFERENCE FOR INERTIAL MEASUREMENT UNITS USING SCENE CORRELATION

CROSS REFERENCE TO RELATED APPLICATIONS

This application claims benefit of U.S. Provisional Application Ser. No. 61/886,382 entitled, "Method for Establishing a North Reference with Screen Correlation" filed Oct. 3, 2013, the entire disclosure of which is incorporated herein by reference.

FIELD OF INVENTION

This invention relates to target acquisition systems, and more particularly to providing a north reference to an inertial measuring unit (IMU) used in a man portable targeting system in which scene correlation with a reference picture provides the IMU with an accurate north reference.

BACKGROUND OF THE INVENTION

As will be appreciated in man portable targeting systems which contain reticles usually mounted on weapons, there is a requirement to be able to accurately target an individual or piece of equipment to within milliradian accuracy. This requirement necessitates an accurate north reference so that the bearing to the target can be accurately ascertained.

Keeping north with conventional inertial measuring units (IMUs) is not currently feasible with man portable military systems. The IMUs necessary for any persistent north keeping in excess of five minutes have weights of more than half pound, consume 3-5 watts (W) of power and have accuracy issues dependent on temperature. Therefore, there is a requirement for an improved way of establishing a north reference in an IMU.

Heretofore, the problem with providing an IMU with a north reference is that either a compass or another mechanical device or hardware was required to find the north reference. While it might be presumed that one could provide a man portable unit with an inertial reference device, such as a north finding gyroscope/compass, the fact is inertial reference devices are exceedingly heavy to ensure durability or ruggedized enough to be used in the field. Additionally, the high cost of such inertial reference devices as well as their power consumption limit the ability to use them on man portable units.

The problem with utilizing a magnetic compass is that the north keeping capability of the compass is constantly varying due to magnetic influences surrounding the compass. This will alter the compass-derived north vector making the compass relatively useless in providing milliradian accuracies.

As to the use of north finding gyroscopes associated with inertial reference devices, these devices require 3-4 minutes of integration time in a non-motion environment, and require a large amount of maintenance, all of which are difficult in the field. Moreover, these devices weigh 3-5 pounds or more due to their inertial gyroscopes, are unwieldy due to their weight alone, and are too bulky to be used in man portable equipment. Additionally, power consumption of between 3 and 5 watts requires large, heavy batteries.

While there exist high resolution maps and while there are compasses and north finding gyros, at present there is no complete man portable targeting system due to the weight, power requirements and time limits for finding north.

Further, there are some celestial devices that can find north extremely accurately. However, on a cloudy day stars can be occluded or will not be available for brief periods of time. Thus, trying to utilize real-time celestial navigation devices for targeting is problematic. Even if true north can be ascertained and maintained to milliradian accuracy, this accuracy is only available for 20 to 30 seconds and degrades over time. After about three minutes the north keeping capability degrades so badly that one cannot target with it any longer.

In an effort to provide military personnel with the ability to provide targeting information for precision ordinances, in the past, a targeting system would survey an engagement area such that there is a reticle placed on a potential target. The scene available to the targeting system does not have an accurate north reference unless provided by an IMU. If within the engagement area there is a north feature such as a building corner, the targeting system's reticle can be manually shifted to overlie the north feature so that the azimuth of the target from north can be ascertained. This overlying procedure requires consummate skill on the part of the soldier and the accuracy is questionable during battlefield conditions due to the inability of the soldier to align his reticle with the corresponding north feature.

Thus, there is a necessity to eliminate manual correction of the north reference supplied to an IMU to eliminate the requirement of manual skill There is therefore a need for an easy to use automatic north reference keeping capability for the IMUs used in targeting.

SUMMARY OF THE INVENTION

Embodiments of the present disclosure provide a system and method for a scene correlation-based target system. Briefly described, in architecture, one embodiment of the system, among others, can be implemented as follows. A reference image depicts a remotely-positioned object having identifiable characteristics, wherein a reference directional vector is established relative to the reference image. A target image of a general vicinity of the remotely-positioned object has an unknown directional vector, the target image having at least a portion of the identifiable characteristics. An inertial measuring unit has a scene correlation system, wherein the scene correlation system matches the portion of the identifiable characteristics of the target image with the identifiable characteristics of the reference image, wherein a slew angle between the reference image and the target image is calculated. A target image directional vector is derived from the calculated slew angle and the reference directional vector.

The present disclosure can also be viewed as providing a method of establishing a directional reference for a target system using scene correlation. In this regard, one embodiment of such a method, among others, can be broadly summarized by the following steps: providing a reference image depicting a remotely-positioned object having identifiable characteristics; establishing a reference directional vector relative to the reference image; using a camera, capturing a target image of a general vicinity of the remotely-positioned object, the target image having an unknown directional vector, wherein the target image has at least a portion of the identifiable characteristics; matching the portion of the identifiable characteristics of the target image with the identifiable characteristics of the reference image; and deriving a target image directional vector from the matched portion of the identifiable characteristics of the target image with the identifiable characteristics of the reference image.

The present disclosure can also be viewed as providing a panoramic scene correlation-based target system. Briefly described, in architecture, one embodiment of the system, among others, can be implemented as follows. A panoramic reference image depicts a remotely-positioned object having identifiable characteristics, wherein a reference directional vector is established relative to the panoramic reference image. A plurality of target images of a general vicinity of the remotely-positioned object is provided, each of the plurality of target images having an unknown directional vector, wherein at least one of the plurality of target images having at least a portion of the identifiable characteristics. An inertial measuring unit has a scene correlation system, wherein the scene correlation system matches the portion of the identifiable characteristics of the at least one of the plurality of target images with the identifiable characteristics of the panoramic reference image. A target image directional vector is derived from the matched identifiable characteristics between the at least one of the plurality of target images and the panoramic reference image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
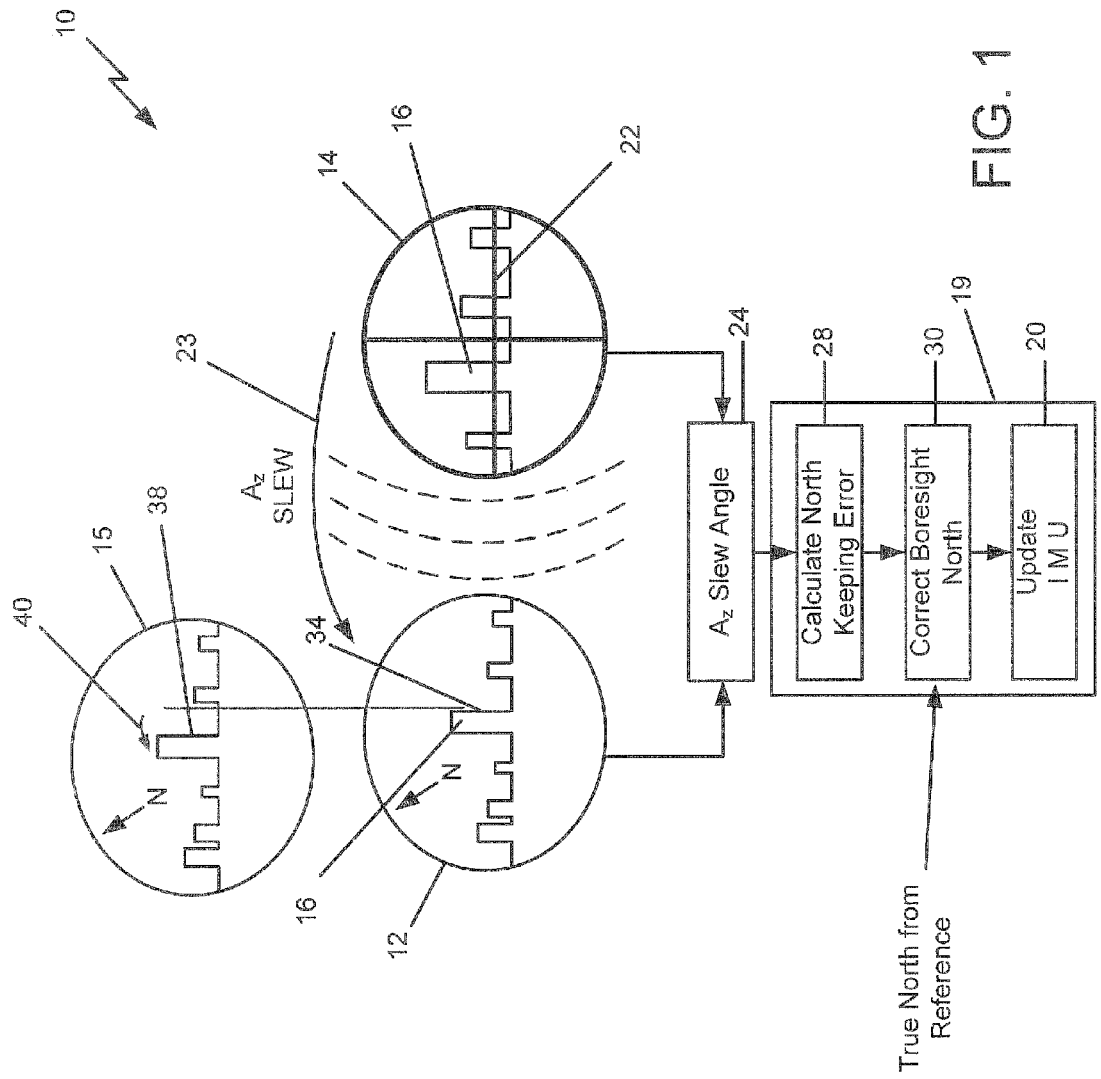
FIG. 1 is a schematic diagram of the man portable targeting system illustrating the correction of boresight north for an IMU utilizing scene correlation between a reference picture having an established true north and a picture taken through the reticle at the engagement area, in accordance with a first exemplary embodiment of the present disclosure.

The subject system provides an updated north keeping capability to the IMU of a man portable targeting system by utilizing scene correlation. According to the present invention, using scene correlation, the user takes a picture, either single, panoramic, or an object at a distance, for instance, at greater than or equal to 2 km. Once a north vector is established utilizing celestial bearing, north finding gyros, or 3-D map correlation, the vector can be tied to the engagement scene simply by taking a picture and storing the image. Sometime later the user engages a target, determines the range, and now needs a bearing to the target. The user engages the target by ranging and taking a picture of the target. The picture validates the correct target was engaged and the IMU position was captured. Scene correlation is then utilized to provide the user with a bearing to the target. The low-cost IMU measures the angle from target engagement scene to reference scene when the operator slews the targeting system from the target to the reference scene and simply takes another picture. The hold engagement is completed in seconds by taking two pictures. The scene correlation measures the difference in both azimuth and elevation of the actual reference stored picture and the picture taken during the engagement. The IMU and the offsets generated from the scene correlation process refine the measurement of the slew angle and eliminate errors in the north vector using scene correlation. The system then determines drift and elevation azimuth to correct the IMU actual north vector reference. In one embodiment, the low-cost IMU with scene correlation is repeatedly calibrated to precision accuracy levels of a full navigation gyro providing an enduring north-keeping capability.

More particularly, a two picture system may be used with one picture having a north reference and the other picture being that which is viewable through a targeting reticle. When actuated, the system takes a picture of the scene surrounding the targeted area as viewed through the reticle. This scene does not usually have an accurate north reference. In order to provide this scene with a precise north reference, the picture taken through the reticle is electronically slewed in azimuth so that it overlies a reference picture having an established north vector. The overlying condition is established by scene correlation of the reticle picture with the reference picture.

It will be noted that the pictures can be taken in the visible region of the electromagnetic spectrum, the LIR region, the SIR region, the MIR region, or the UV region, and that a reference picture taken during the day in the visible region, for instance, can be used at night when the reticle picture may be an IR picture, for instance. Thus, engagement areas can be captured utilizing any region of the electromagnetic spectrum and reticle pictures may be compared to these reference pictures in a cross-band manner without loss of north keeping capability.

It will be appreciated that a reference picture may be taken at one time, and assuming the field of view is about the same for the reticle picture, regardless if clouds ensue, rain comes, or darkness falls, whatever reticle picture is available at the time of targeting may be cross-correlated with the reference picture taken in a different electromagnetic frequency band. This ability gives exceptional flexibility to the system, such that reference pictures having advantageous conditions may be used when the conditions subsequently deteriorate.

Thus, assuming that the engagement area has not changed radically and that the targeting reticle is within the engagement area, and further that a feature on the reference picture is at some distance from the cameras, for instance kilometers, the north reference preserved in the reference picture can be utilized regardless of the fact that the targeting reticle picture is taken later or from a position removed from the original reference camera position.

The north vector may be established either through celestial bearing, north finding gyroscopes, or 3-D map correlation. When the reticle picture is slewed over to overlie the reference scene picture, the slewing angle is measured to establish the azimuth error between the north depicted in the targeting reticle picture and the north established by the reference scene picture. Having established the slewing angle, it is possible to calculate the north keeping error and to correct for true north by using this error to update the IMU carried by the targeting system.

Scene correlation in one embodiment uses pictures that are converted into line drawings using the Sobel method. This converts pictures into line drawings by finding the light/dark contrast of the images in the picture that define the edges between the light and dark regions. By utilizing scene matching and these Sobel line drawings, one can do the scene matching very quickly.

Moreover, the overlying condition in one embodiment is ascertained by a technique that ascertains the center of the two pictures. The system then measures the distance between the centers of the two pictures in order to obtain the slewing angle. The centers of the pictures are accurately determined utilizing the line drawing technique described above, so that it is unnecessary to analyze each of the pixels in each of the pictures in order to determine an overlap or to determine the angular distance that one picture has to be shifted in order to overlap the other picture.

In short, personnel in theater take an engagement scene picture having a verifiable north reference. This then becomes the reference picture against which the reticle picture is compared. Once having ranged the target, the reticle picture is slewed to the vicinity of the reference picture containing the north vector. The subject system measures the angular slewing of the target reticle picture to the reference image picture, with scene correlation measuring the difference in both azimuth and elevation between the reference image picture, and the picture taken through the reticle during the engagement. The above difference in azimuth is utilized to correct the IMU with offsets generated from the scene correlation process, with the measurement of the slew angle eliminating errors generated by the operator if manual slewing were to be employed.

It will be appreciated that the manual slewing associated with precision realignment of reticle north with true north is eliminated, making the operator's job easier and far more precise due to the automatic scene correlation techniques described herein.

It is also possible to take a panoramic picture of the engagement area and use this panoramic picture as the reference picture. In one embodiment, the panoramic engagement reference image is stored in memory. The reticle picture at the time of targeting is slewed to the corresponding reference picture so as to provide the IMU with a precision north vector.

Once a panoramic image is stored, IMU errors can be removed at regular intervals to remove bias errors. It is noted that the typical low-cost IMU has a drift of one milliradian for every 10 seconds. In one embodiment, every 10 to 20 seconds, a reference picture in any band, such as the thermal, visible, near infrared, or UV, can be utilized as a reference image. Thereafter this reference image is used with scene correlation to determine the drift in azimuth to correct the IMU. It is noted that the low-cost IMU utilizing scene correlation may be repeatedly recalibrated to precision and accuracy levels of a full navigation gyro so as to provide an enduring North keeper capability to man portable units. Thus, the subject system updates a low-cost IMU to provide enduring north keeping at a fraction of the cost of a full navigation Gyro.

In summary, what is provided is a system for automatically updating an IMU used for precision targeting in which a reference picture of the engagement area having an established North vector is used in a scene correlation process in which a target reticle picture is cross correlated with the reference picture to establish the error between the North associated with the target reticle picture and that of the reference picture, the error being utilized to correct the IMU output to provide for milliradian North keeping.

FIG. 1 is a schematic diagram of the man portable targeting system 10 illustrating the correction of boresight north for an IMU utilizing scene correlation between a reference picture having an established true north and a picture taken through the reticle at the engagement area, in accordance with the first exemplary embodiment of the present disclosure. The man portable targeting system 10 includes the use of two cameras, not shown, which produce a reference image 12, such as a picture of engagement area, and a reticle image 14 of the target location corresponding to the view through a reticle. The picture associated with the field of engagement depicts stationary object(s), which are identifiable and which exist at some distance from the targeting location. These objects may be referred to herein as identifiable objects 16. In one embodiment, the distance between the targeting location and the identifiable objects 16 is greater than 2 Km, ideally at 10 Km, which eliminates parallax considerations, however distances less than or greater than 2 km are also envisioned.

When it is desired to get the targeting information from the targeting reticle, it is first necessary for personnel to obtain a reference image 12, such as a picture used as a reference that contains an identifiable feature or structure, which is known as the identifiable object 16. In this case, the structure may be the edge of a tall building which serves as the identifiable object 16, but other objects may also serve as the identifiable object 16. For example, any single object or grouping of objects that has one or more identifiable characteristic may serve as the identifiable object 16, such as a mountain range, a field with small features, the tree line of a forest, or the building landscape of a city or town, among others. The structure serving as the identifiable object 16 is viewable by the targeting reticle as illustrated in FIG. 1.

In order to obtain accurate targeting information it is necessary that true north be established for the scene viewed by the targeting reticle. Ordinarily the north vector is provided through an IMU 19, so that when the crosshairs 22 of the reticle are placed on a target, the azimuth of this target from the north vector can be ascertained. As mentioned here before, the problem is that the accuracy of the north vector in the targeting reticle is questionable, and therefore, it is necessary to provide updated information to the IMU 19 at block 20, so that an accurate azimuth to the target can be ascertained.

In order to provide updated information to the IMU, the reticle image 14 is manually slewed (as illustrated by arrow 23) so that it overlies reference image 12. Reference image 12 is provided with a north vector in one embodiment from celestial measurements, which can be done at some time prior to the targeting procedure so that when the reticle image 14 is slewed to the reference image 12, referencing the reticle image 14 to the celestially obtained true north provides an error correction that is utilized to compensate or update the IMU 19 at block 20. As will be described, the subject invention involves electronic slewing so as to register the reticle image 14 with the reference image 12. When these two images are registered after the slewing operation, the system 10 detects the slew angle 24 through which the reticle image 14 has been slewed in order to correspond to the reference image 12. The amount of slewing is detected and a north keeping error is calculated at block 28. Thereafter boresight north is corrected at block 30 which also has as an input true north from the reference.

The amount of lateral slewing required in order to line up the reticle image 14 and the reference image 12 is shown by line 23, which corresponds to the identifiable object 16 within the reference image 12 and the scene correlated reference image 15. In the present example, the particular feature of the identifiable objection 16 is the right-hand edge of the building. During the slewing process, the reticle image 14 moves to the left, such that edge 34 of identifiable object 16 corresponds to edge 38 of the identifiable object within the scene correlated reference image 15. This movement may be referred to as a shift 40, which is characterized as the electronic shift required for the reticle image 14 to overlie with the reference image 12 that is used in the IMU correction. The software that determines the offset error utilizing scene correlation, as will be described hereinafter.

A cross correlation algorithm is applied for scene correlation so that when the reticle image 14 lies directly on top of the reference image 12, the slewing angle 24 can be accurately determined. Alternatively, one can measure the distance between pixels in the targeting reticle image 14 and the reference image 12, and arrive at the shift 40 or slewing angle 24 from this distance computation.

Figure 2:
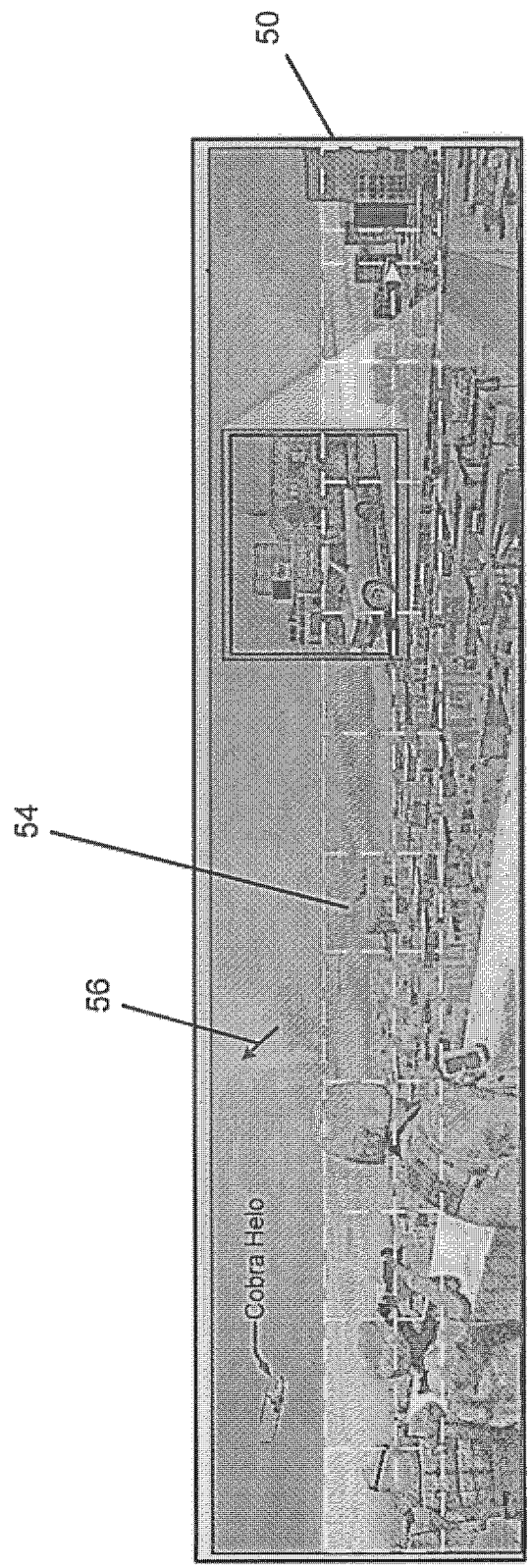
FIG. 2 is a diagrammatic illustration of a panoramic view of an engagement area in which a real-time panoramic scene is calibrated to a celestial reference so as to provide a true north reference for the picture, in accordance with the first exemplary embodiment of the present disclosure.

FIG. 2 is a diagrammatic illustration of a panoramic view 50 of an engagement area in which a real-time panoramic scene is calibrated to a celestial reference so as to provide a true north reference for the picture, in accordance with the first exemplary embodiment of the present disclosure. While the subject invention will be described utilizing single pictures, both for the reticle image and the reference image, it is possible to create a panoramic reference by swinging the camera across the engagement area which incorporates for instance, in this case a building 54. Also associated with this panoramic view is a celestially described north keeping vector 56 which is referenced to all of the individual camera scans from left to right. Thus, the north keeping vector 56 correlates to all of the individual fields of view of the camera that creates the panoramic view.

In operation, the system defines north using celestial, 3-D map reference points or north finding gyros. The operator scans the target area illustrated as the panoramic view 50 and the system generates real-time panoramic scene images, calibrated to the celestial reference. Geo-references within the scene are established, such as buildings, mountains, trains, and other artifacts using an onboard IMU. The result is a real-time, virtual Geo-reference map calibration system which provides multiple images as reference images to which a reticle image can be cross correlated.

As will be described, in scene correlation, is not necessary that each corresponding pixel in the both pictures overlie one another. Rather, as will be discussed, the images in the pictures can be analyzed and the point of overlap can be ascertained without having to physically line up one feature of the target reticle with the same feature in the reference image. Rather than utilizing pixel-by-pixel correlation, as will be seen in connection with FIGS. 4A-4C, a 2-D correlation result can be obtained by electronically finding the center of each image, and detecting the distance between the two centers. When these two centers are aligned, the slew angle is measured and the IMU is updated. Even if the centers are not aligned, the distance between the two centers, when ascertained, can be utilized to correlate to a slew angle.

It will be appreciated that such a system is lightweight and consumes very little power so that the advantages of having an on-site navigational Gyro have been achieved without the weight, size and power consumption of such a Gyro. This makes a system exceedingly easy for man portability.

Another benefit of using a panoramic reference picture 12 is that an inexpensive IMU can be utilized and effectively made to be a navigational grade IMU by correcting the bias drift of the fly. For example, approximately every 20 seconds, or another length of time, a comparison of the reticle image 14 and position may be taken by the IMU and compared to the panoramic reference image 12. The bias drift of the IMU may then be calculated. This process may be repeated periodically to continually update the IMU. For example, once corrected, the IMU may be accurate for the next few seconds following the comparison, at which point the process is repeated and the IMU is updated again.

Figure 3:
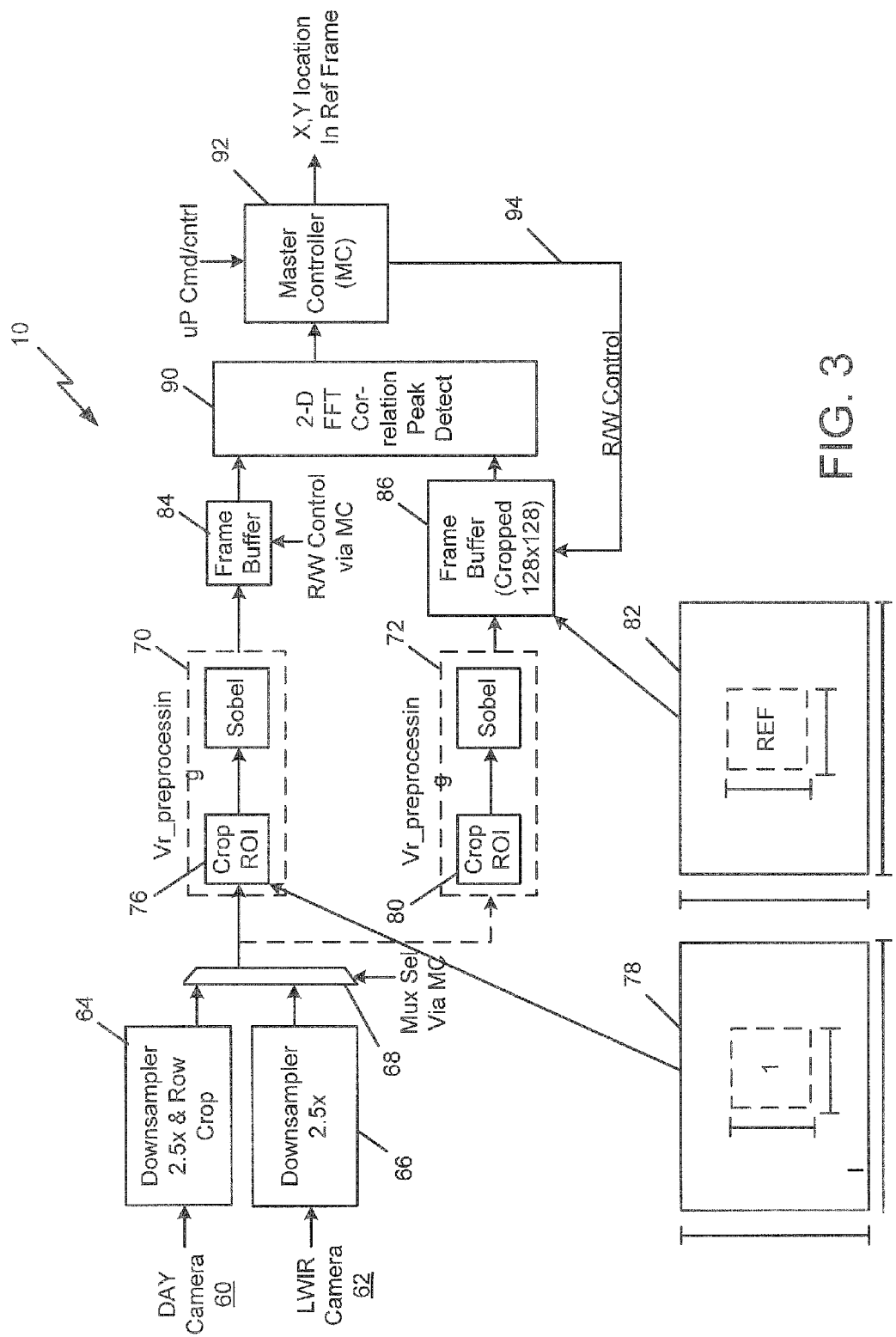
FIG. 3 is a block diagram for a scene based north keeping system illustrating the cross correlation between a reticle-based picture and a reference picture, in accordance with the first exemplary embodiment of the present disclosure.

FIG. 3 is a block diagram for a scene based north keeping system 10 illustrating the cross correlation between a reticle-based picture and a reference picture, in accordance with the first exemplary embodiment of the present disclosure. In order to reference the reticle image 14 with a reference image 12 (FIG. 1), a scene based North keeping system is described which, in one embodiment, has a day camera 60 and an LWIR camera 66. The output from the day camera 60 is down sampled at downsampler 64, with the output of the LWIR camera 62 down sampled at downsampler 66. While only one camera need be utilized for both the reticle view and the reference view, in the illustrated embodiment two cameras operating in different wavelengths or bands may be used to capture daylight views, or nighttime views. It has been found that the registration of the results of a nighttime view with a daytime view is exceedingly high so that the subject system may be utilized over a 24-hour period, for example, where there may be a variety of clouds, sunshine, darkness, fog or other optical impediments. The outputs of cameras 60, 62 from downsamplers 64, 66, respectively, are multiplexed at multiplexer 68 and are provided respectively to processing channels 70, 72. In general, in processing channel 72, there is a cropping module 76 which crops the scene from the reticle camera. The reticle camera provides a cropped size of 130×130, as illustrated at 78, but other sizes may be used.

In order to provide the reference image, the outputs either from the day camera 60 or the LWIR camera 62 are provided to processing channel 72 which carries with it a cropping module 80. After the output leaves processing channel 72, it enters frame buffer 86 which crops the image to reference image 82. In this example, the reference image 82 may be cropped to a size of 128×128.

It is noted that in each of the processing channels 70, 72, the cropped images are converted into Sobel line drawings at frame buffers 84, 86, respectively, by the application of Sobel filtering algorithms. Thereafter, as illustrated, a 2-D FFT cross correlation pass 90 is used to detect the cross correlation coefficient from which can be derived the aforementioned skew angle. Thereafter a master controller 92 provides an offset for the aforementioned IMU in terms of X, Y locations in the reference image, which is accomplished utilizing the cross correlation peak for each of the images. It is noted that the master controller 92 provides a read/write control 94 to frame buffer 86 for reference picture 82

Figure 4C:
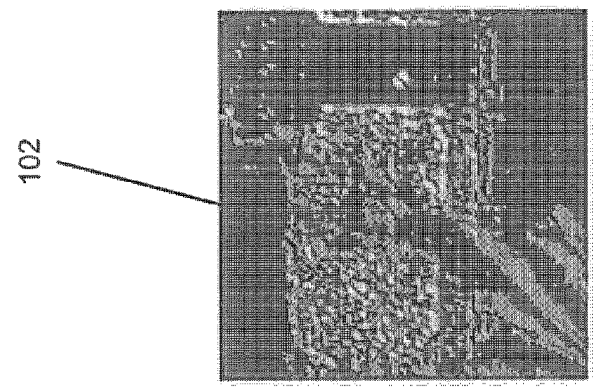
FIGS. 4A, 4B, and 4C are a series of pictures showing the cross correlation between a first picture and a second picture in a first frame, and a second frame, with the 2-D correlation result corresponding to the correlation between the centers of the two pictures, in accordance with the first exemplary embodiment of the present disclosure.
Figure 4B:
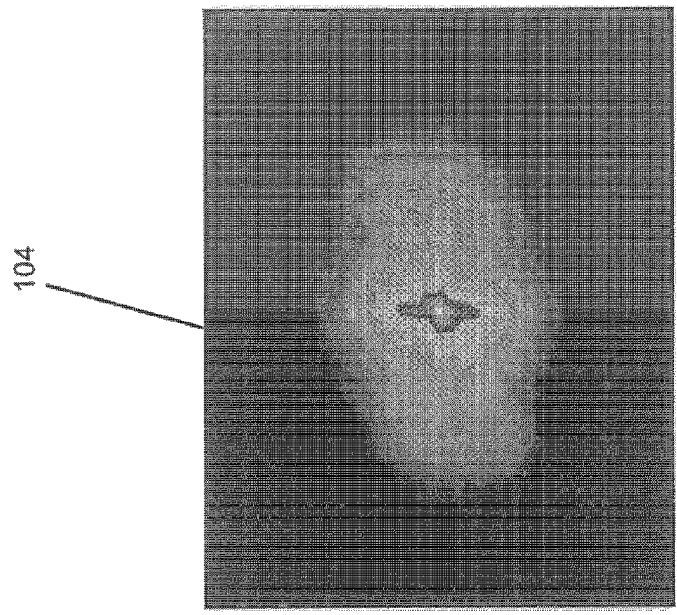
Figure 4A:
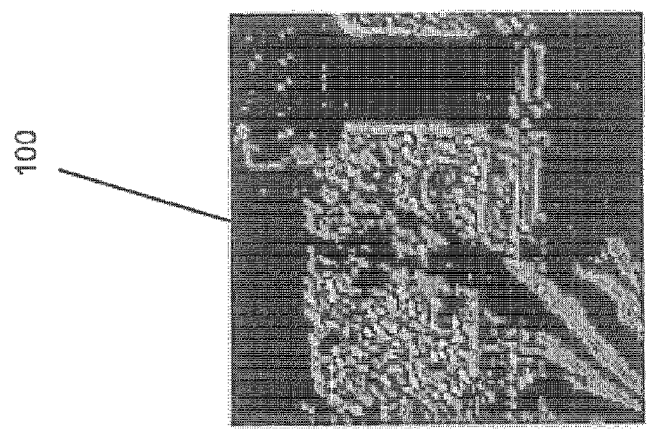

FIGS. 4A-4C are a series of pictures showing the cross correlation between a first picture and a second picture in a first frame, and a second frame, with the 2-D correlation result corresponding to the correlation between the centers of the two pictures, in accordance with the first exemplary embodiment of the present disclosure. While it is possible to pursue a pixel-by-pixel cross-correlation, it has been found that a simpler cross-correlation technique utilizing the Sobel transform line drawings of the two images can be utilized. As is shown in FIG. 4A, a first frame 100 is cross correlated with a second frame 102 in FIG. 4C. There is a peak correlation result 104 shown in FIG. 4B that defines where the center of frame 102 is positioned within frame 100. Having been able to detect where the centers of the frames 100, 102 are positioned with respect to each other, it is then possible to generate the slewing angle discussed relative to FIG. 1.

Figure 5:
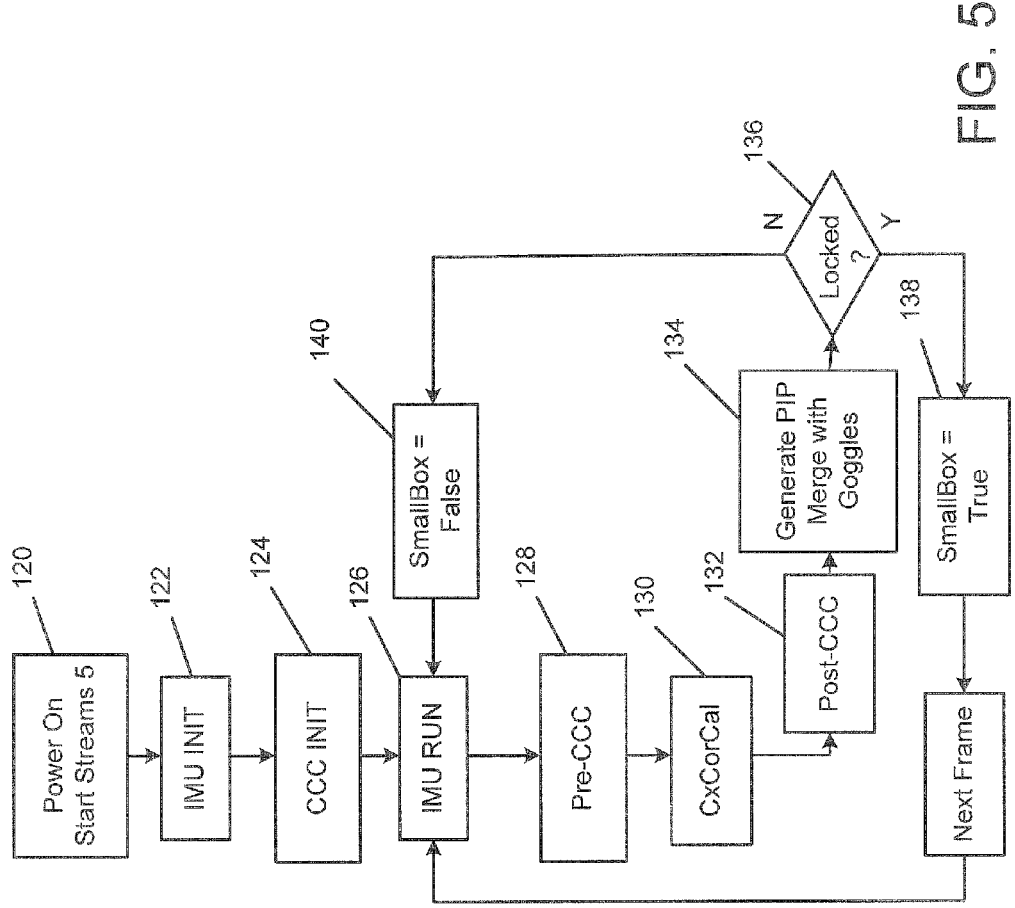
FIG. 5 is a flowchart showing the cross correlation calculation for use in the correction of an IMU to provide North keeping capabilities for the IMU, in accordance with the first exemplary embodiment of the present disclosure.

FIG. 5 is a flowchart showing the cross correlation calculation for use in the correction of an IMU to provide North keeping capabilities for the IMU, in accordance with the first exemplary embodiment of the present disclosure. In particular, FIG. 5 depicts the processing described relative to FIGS. 1-4C. At block 120, the stream is turned on. In one example, five streams are started but other quantities of streams may be used as well. The IMU is initialized as illustrated at block 122, followed by cross correlation initialization at block 124, after which the IMU is run as illustrated at block 126. As illustrated at block 128, there is a pre-cross correlation process for resampling of frames and generation of decimation factors which is followed by a template rotation process at block 130. At block 132 there is a post-cross correlation process which detects the best solutions for X out and Y out and forms a weighted solution for use in updating the IMU.

After post-cross-correlation, the system generates a picture-in-picture (PIP) which is merged with the goggles at block 134. If there is a satisfactory correlation, as illustrated by block 136, the correlation result is returned as a 'small box=true' at block 138. If the post-cross-correlation result is not satisfactory, decision box at block 136 returns a 'small box=false' as illustrated at block 140, which indicates that the cross-correlation failed. The process may be repeated, starting with IMU run at block 126.

As to the IMU initiation at block 122, the default is set at an NX=320 and NY=240 which is buffered and updated. At the same time, the cross correlation unit is initialized at block 124 by setting the parameters for the frame size, for instance at 640×480, and a field of view ratio and ratio threshold are defined. Moreover, the small box ratio, or size, is defined, as well as defining 'small box=false'. Also, PIP size, waiting functions and weights, or other thresholds are defined at block 124.

After the IMU and the cross correlation model are initialized at blocks 122 and 124, respectively, the IMU is run at block 126 which computes the difference in roll angle (dphi) between the reference image 12 and the engagement reference image 15 to ensure reasonable alignment (dphi=phiB−phiA). If needed, a rotation of the engagement image 15 is performed to ensure the roll differential of approximately less than 6 mrads. Delta X (Azimuth) and Delta Y (Elevation) is calculated as a single event for a targeting system or up to 65 Hz for a real-time system (google); which results in NX=NX0+delta X and NY=NY0+delta Y for accurate X (Azimuth) and Y (elevation) determination.

As illustrated at block 128, pre-cross-correlation processing can result in resampling of frames or decimation factors. At block 130, the cross-correlation may require rotating a template by dphi so as to accommodate cross correlation to frames of a different size, after which a correlation map is generated at block 132. The system selects the best solutions for X out and Y out using form weighted solutions in one embodiment, so as to define NX and NY, which is then utilized to correct the IMU. The system generates a PIP merge with the goggles at block 134 to generate a PIP of a given size, shape, scaling, and to which is added VR merge the PIP center with goggles image at VR location (NX, NY).

Figure 6:
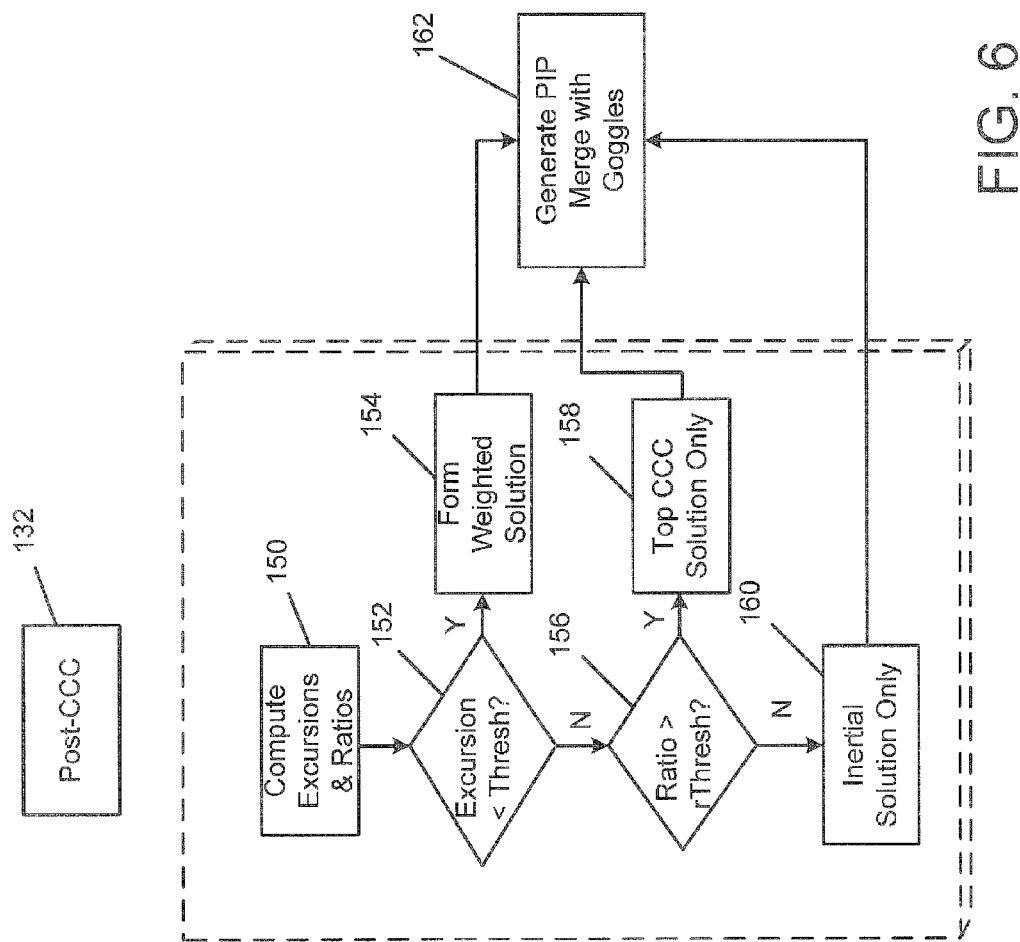
FIG. 6 is a flowchart showing post cross correlation process routines which account for either form weighted solutions or top cross correlation solutions only, in accordance with the first exemplary embodiment of the present disclosure.
Figure 7A:
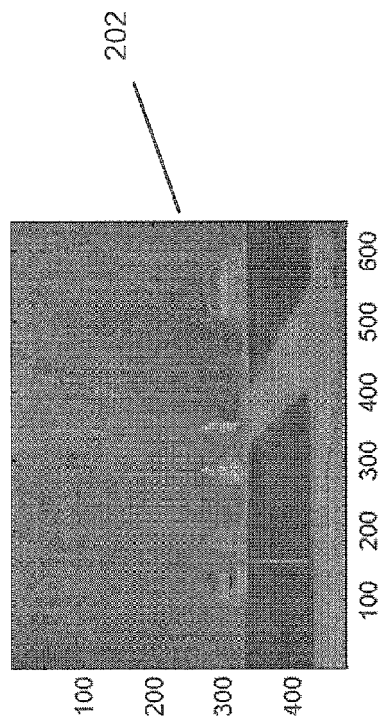
FIGS. 7A, 7B, 7C, and 7D are a series of photographs illustrating a reticle view and a reference view, also showing a corresponding inlay for the two, in accordance with the first exemplary embodiment of the present disclosure.
Figure 7B:
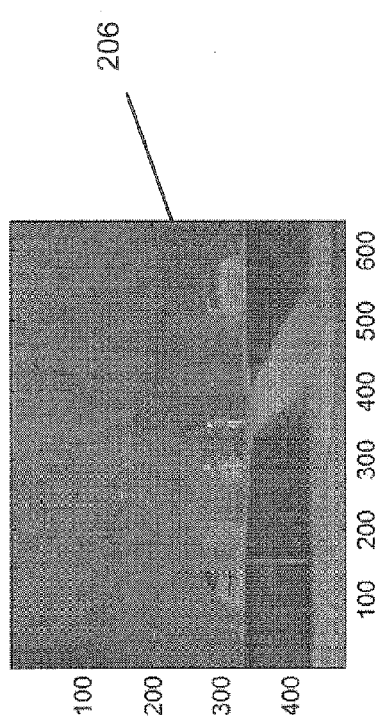
Figure 7C:
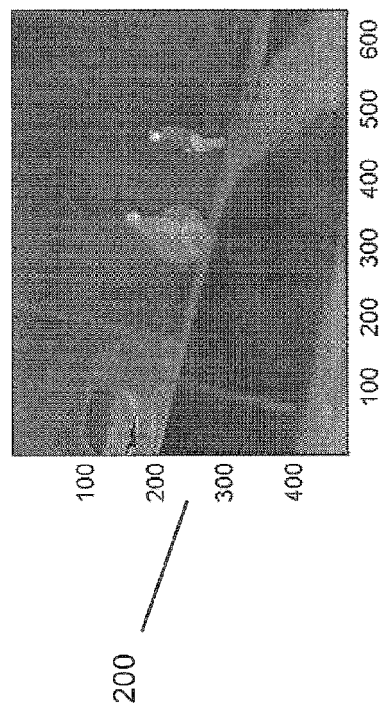
Figure 7D:
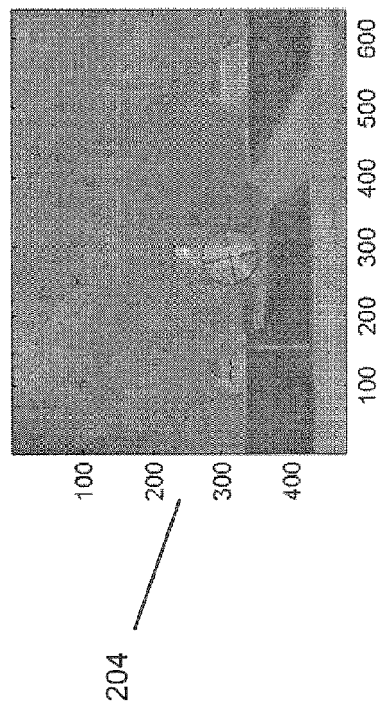

FIG. 6 is a flowchart showing post-cross-correlation process routines which account for either form weighted solutions or top cross correlation solutions only, in accordance with the first exemplary embodiment of the present disclosure. The post cross-correlation subroutine of block 132 of FIG. 5 is described in detail in FIG. 6, in which excursions and ratios are computed at block 150. If excursions and ratios are beneath a predetermined excursion threshold 152, a form weighted solution at block 154 is outputted. If the computed excursion and ratios excursion is above the ratio threshold at block 156, a cross-correlation solution only is outputted at block 158. If the ratio is not greater than either the excursion threshold 152 or the ratio threshold 156, then the inertial solution only is outputted at block 160. It is noted that the form weighted solution at block 154, the top-cross-correlation solution at block 158 and the inertial solution at block 160 are outputted to generate PIP merged within the goggles at block 162.

Figure 8B:
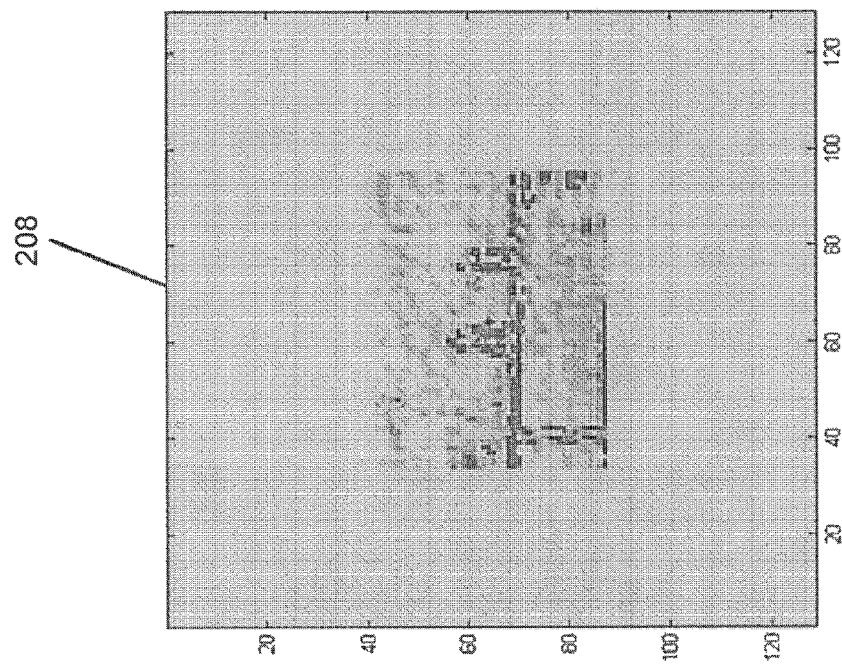
FIGS. 8A and 8B show a Sobel edge defining representation of the reticle and reference pictures of FIGS. 7A-7D, in accordance with the first exemplary embodiment of the present disclosure; and, FIGS. 9A and 9B are a Solon edge defining representation of the reticle and reference pictures of FIGS. 8A-8B zoomed in on a Figure illustrating the ability to cross correlate edges of a Figure within an engagement area, in accordance with the first exemplary embodiment of the present disclosure.
Figure 8A:
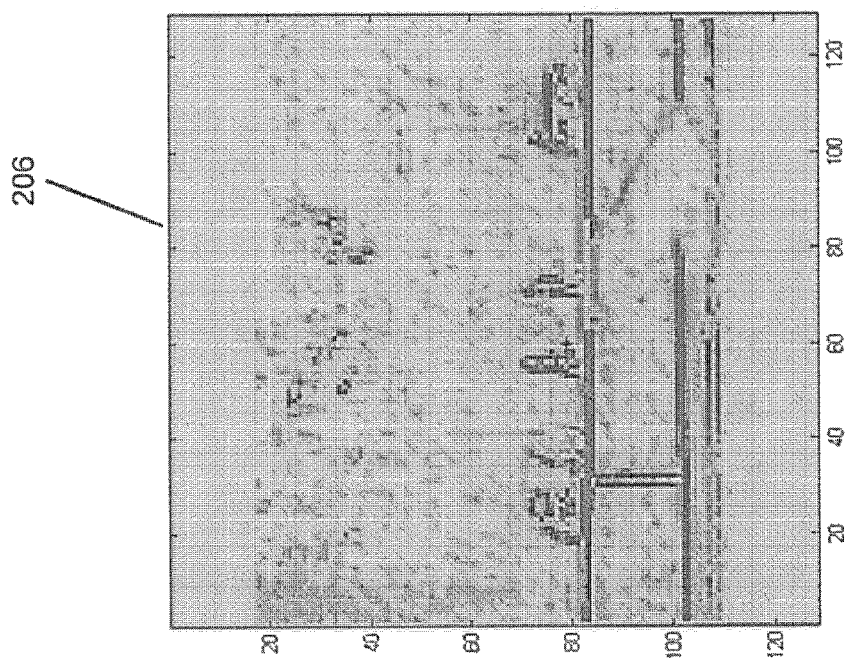
Figure 9A:
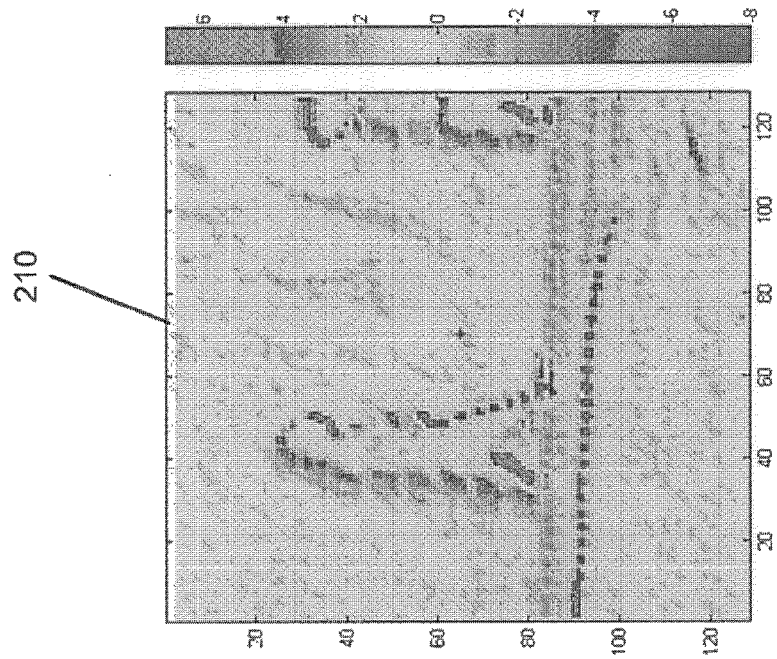
Figure 9B:
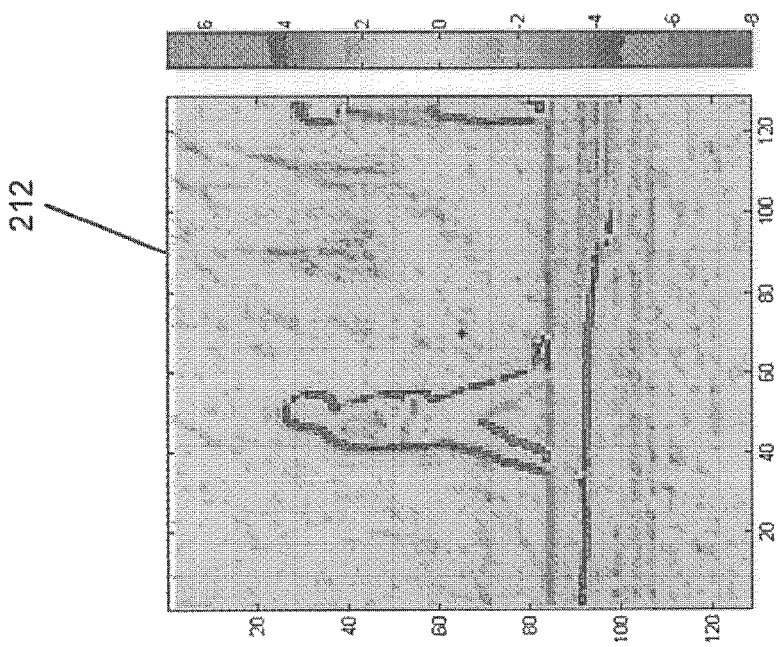

FIGS. 7A-7D are a series of photographs illustrating a reticle view and a reference view, also showing a corresponding inlay for the two, in accordance with the first exemplary embodiment of the present disclosure. FIGS. 8A-8B show a Sobel edge defining representation of the reticle and reference pictures of FIGS. 7A-7D, in accordance with the first exemplary embodiment of the present disclosure. FIGS. 9A-9B are a Sobel edge defining representation of the reticle and reference pictures of FIGS. 8A-8B zoomed in on a Figure illustrating the ability to cross correlate edges of a Figure within an engagement area, in accordance with the first exemplary embodiment of the present disclosure. Referring to FIGS. 7A-7D, shown are infrared images of the reticle scene and a reference view respectively at 200 and 202. These images are scaled and inlayed as illustrated at 204 and 206 so as to be able to zoom in on the target. As illustrated in FIGS. 8A-8B, the Sobel filtered line drawings for the images of FIGS. 7A-7D are shown at 206 and 208, in which the Sobel image 208 line drawing is expanded as illustrated 206. Likewise referring to FIGS. 9A-9B in a second processing stage a line drawing 210 is further refined into lines as illustrated by image 212.

Figure 10:
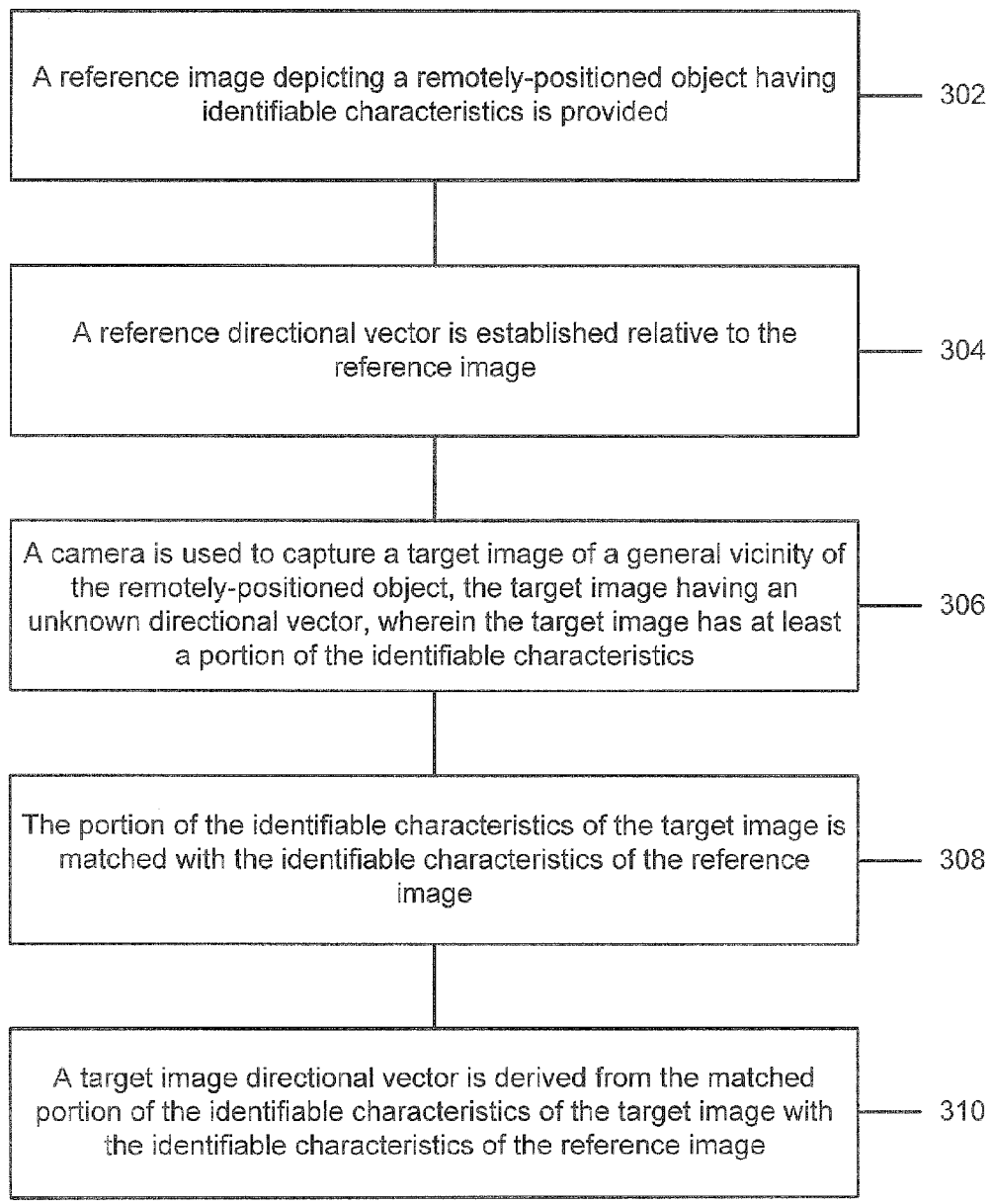
FIG. 10 is a flowchart illustrating a method of establishing a directional reference for a target system using scene correlation in accordance with a second exemplary embodiment of the disclosure.

FIG. 10 is a flowchart 300 illustrating a method of establishing a directional reference for a target system using scene correlation in accordance with a second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, a reference image depicting a remotely-positioned object having identifiable characteristics is provided. A reference directional vector is established relative to the reference image (block 304). A camera is used to capture a target image of a general vicinity of the remotely-positioned object, the target image having an unknown directional vector, wherein the target image has at least a portion of the identifiable characteristics (block 306). The portion of the identifiable characteristics of the target image is matched with the identifiable characteristics of the reference image (block 308). A target image directional vector is derived from the matched portion of the identifiable characteristics of the target image with the identifiable characteristics of the reference image (block 310).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A scene correlation-based target system, comprising:
   a first camera operable in a first electromagnetic spectrum and a second camera operable in a second electromagnetic spectrum different than the first electromagnetic spectrum, the first camera located at a first position and the second camera located a second position different than the first position, and wherein the first and second positions are adjacent combat theater;
   a target remote from the first and second cameras positioned in an engagement area;
   a reference image captured by the first camera in the first electromagnetic spectrum at the first position depicting a remotely-positioned reference scene including a contrast differential boundary line matching a profile of the remotely-positioned reference scene, wherein a known reference directional vector is established between the first camera and a remotely-positioned reference object in the reference scene;
   a first range established from the first camera at the first position to the remotely-positioned reference object;
   a second range established from the second camera at the second position to the target;
   a target image captured by the second camera in the second electromagnetic spectrum at the second position and including the target located near a general vicinity of the remotely-positioned reference object having an unknown directional vector between the second camera and the target, the target image having at least a portion of the contrast differential boundary line matching the profile of the remotely-positioned reference scene;
   an inertial measuring unit having a scene correlation system, wherein the scene correlation system matches the portion of the contrast differential boundary line matching the profile of the remotely-positioned reference scene of the target image with the contrast differential boundary line matching the profile of the remotely-positioned reference scene of the reference image, wherein an angle between the reference image and the target image is calculated;
   a target image directional vector derived from the calculated angle, and the reference directional vector; and
   a calculated target location in the engagement area derived from the target image directional vector and the second range.

2. The scene correlation-based target system of claim 1, wherein the reference directional vector is a North vector.

3. The scene correlation-based target system of claim 1, wherein both the target and the remotely-positioned reference object are positioned at least 2 kilometers (km) away from the first camera and the second camera to reduce parallax.

4. The scene correlation-based target system of claim 1, wherein the scene correlation system matches the portion of the contrast differential boundary line matching the profile of the remotely-positioned reference scene of the target image with the contrast differential boundary line matching the profile of the remotely-positioned reference scene of the reference image by directly overlying the target image atop the reference image and calculating an offset error of the contrast differential boundary line matching the profile of the remotely-positioned reference scene in the target image with the contrast differential boundary line matching the profile of the remotely-positioned reference scene in the reference image.

5. The scene correlation-based target system of claim 4, wherein the differences in contrast are determined by pixel correlation.

6. The scene correlation-based target system of claim 1, wherein contrast differential boundary line matching the profile of the remotely-positioned reference object further comprises a line drawing defining a boundary between the remotely-positioned reference object and a background of each of the reference image and target image.

7. The scene correlation-based target system of claim 1, wherein each of the reference image and the target image are stored in a system memory.

8. The scene correlation-based target system of claim 1, wherein the target image directional vector is provided with an azimuth and an altitude.

9. The scene correlation-based target system of claim 1, wherein for each of the reference image and target image, the contrast differential boundary line matches an entirety of a visible profile of the remotely-positioned reference scene, wherein the reference image is captured in a visible spectrum.

10. The scene correlation-based portable target system of claim 1, wherein the second camera is incorporated into a pair of night vision goggles and the second electromagnetic spectrum is infrared.

11. The scene correlation-based portable target system of claim 1, wherein the first electromagnetic spectrum is visible light and the second electromagnetic spectrum is infrared.

12. A panoramic scene correlation-based target system comprising:
   a first camera operable in a first electromagnetic spectrum and a second camera operable in a second electromagnetic spectrum, the first camera positioned at a first position and the second camera positioned at a second position different than the first position while operated by an operator adjacent combat theater;
   a target remote from the camera positioned in an engagement area;
   a panoramic reference image captured by the first camera at the first position depicting a remotely-positioned reference scene having an identifiable profile outline, wherein a reference directional vector is established relative to an object in the panoramic reference image;

a plurality of target images captured by the second camera at the second position near a general vicinity of the remotely-positioned reference scene, each of the plurality of target images having an unknown directional vector, wherein at least one of the plurality of target images having at least a portion of the identifiable profile outline;

an inertial measuring unit having a scene correlation system, wherein the scene correlation system matches a line drawing corresponding to a contrast differential of the portion of the identifiable profile outline of the at least one of the plurality of target images with a line drawing corresponding to a contrast differential of the identifiable profile outline of the panoramic reference image; and a target image directional vector derived from the matched line drawings corresponding to the contrast differentials of the identifiable profile outlines between the at least one of the plurality of target images and the panoramic reference image and a calculated target location in the engagement area derived from the target image directional vector and second camera at the second position.

13. The panoramic scene correlation-based target system of claim 12, wherein the reference directional vector is a North vector.

14. The scene correlation-based target system of claim 12, wherein, when the target image center is directly overlaid the reference image center, the scene correlation system matches the line drawings corresponding to the contrast differential of the identifiable profile outlines between the at least one of the plurality of target images and the panoramic reference directional vector by matching differences in contrast between the line drawing corresponding to the contrast differential of the identifiable profile outline within the panoramic reference image and a background of the panoramic reference image with differences in contrast between the portion of the line drawings corresponding to the contrast differential of the identifiable profile outline within the target image and a background of the target image.

15. A method of establishing a directional reference for a target system using scene correlation, the method comprising the steps of:

capturing from a first camera at a first position a reference image depicting a remotely-positioned reference scene having an identifiable profile outline;

establishing a reference directional vector from the first camera relative to the reference image;

capturing from a second camera at a second position different than the first position, a target image including a target located near a general vicinity of the remotely-positioned reference scene, the target image having an unknown directional vector, wherein the target image has at least a portion of the identifiable profile outline;

reducing parallax by establishing a distance greater than 2 km between the first and second cameras and the remotely-positioned scene;

matching the portion of a line drawing corresponding to a contrast differential of the entire reference image with the identifiable profile outline of the target image;

deriving a target image directional vector from the matched portion of the line drawing corresponding to the contrast differential of the entire reference image and the identifiable profile outline of the target; and determining a calculated target location within an engagement area from the target image directional vector and a range established from the first camera to the target.

16. The method of claim 15, further comprising the step of calculating an angle between the reference image and the target image relative to the second camera, wherein the target image directional vector is derived from the calculated angle and the reference directional vector.

17. The method of claim 15, wherein the step of matching the portion of the line drawing is accomplished by registering the target image directly above the reference image to derive the target image directional vector.

18. The method of claim 15, wherein matching the line drawing corresponding to the contrast differential of the entire reference image with the portion of the identifiable profile outline of the target image further comprises matching differences in contrast between the line drawing corresponding to the contrast differential of the identifiable profile outline within the reference image and a background of the reference image with differences in contrast between the portion of the line drawing corresponding to the contrast differential of the identifiable profile outline within the target image and a background of the target image.

19. The method of claim 18, wherein matching the portion of the line drawing corresponding to the contrast differential of the identifiable profile outline of the target image with the line drawing corresponding to the contrast differential of the identifiable profile outline of the reference image further comprises identifying the differences in contrast by pixel correlation.

20. The method of claim 15, wherein the reference image further comprises a panoramic reference image and the target image further comprises a plurality of target images.

21. The method of claim 20, wherein matching the portion of the line drawing corresponding to the contrast differential of the identifiable profile outline of at least one of the plurality of target images with the line drawing corresponding to the contrast differential of the identifiable profile outline of the reference image further comprises:

periodically making a comparison of the at least one of the plurality of target images with the reference image;

periodically taking a position measurement with an inertial measurement unit (IMU) associated with the at least one of the plurality of target images; and calculating a bias drift with an IMU based on the comparison and the position measurement of the IMU, then correcting the bias drift to establish a navigational grade IMU.

* * * * *